Nov. 3, 1964

A. GARSHICK 3,155,768

BUOYANT CABLE

Filed Aug. 14, 1961

INVENTOR.
ALFRED GARSHICK
BY
*Kinway, Jenney & Hildreth*
ATTORNEYS

Nov. 3, 1964  A. GARSHICK  3,155,768
BUOYANT CABLE

Filed Aug. 14, 1961  2 Sheets-Sheet 2

INVENTOR.
ALFRED GARSHICK

ATTORNEYS

United States Patent Office 3,155,768
Patented Nov. 3, 1964

3,155,768
BUOYANT CABLE
Alfred Garshick, Raynham, Mass., assignor to Boston Insulated Wire & Cable Co., Dorchester, Mass., a corporation of Massachusetts
Filed Aug. 14, 1961, Ser. No. 131,361
9 Claims. (Cl. 174—101.5)

This invention relates to buoyant cables and more particularly to a novel and improved multi-conductor buoyant cable which is particularly adapted for use in towing an instrumented device while at the same time providing power and signal conductors to and from the device.

In the usual buoyant cable the buoyancy of the cable is achieved by incorporating into the cable large masses of low density material such as cellular rubber or closed cell expanded polyethylene. A structure exemplary of this approach is shown in U.S. Patents Nos. 2,403,693 and 2,818,905. The large mass of buoyant material required to float the cable usually results in an undesirably large diameter of the cable. Also the material utilized to provide the buoyancy is of a type which requires special machinery and processes for laying up the cable. Another disadvantage of many prior buoyant cables is that if a leak develops in the cable it is not possible to remove the water from within the cable, and the entire cable is thereafter useless.

The primary object of the present invention is to provide a buoyant cable having a novel and improved construction for providing the buoyant feature thereof and by which the cable may be fabricated using conventional cable processing equipment.

It is a further object to provide a novel and improved buoyant cable of the type described which will have a smaller diameter to a number of conductors ratio, which may be cleared of water should a leak develop so that the cable may again be utilized, which will provide better electrical shielding and which will provide improved strength longitudinally of the cable and will facilitate mechanical connection of the cable to the towing and towed vehicles.

Other objects and advantages will be in part apparent and in part pointed out in more detail hereinafter.

The objects and advantages of the present invention are achieved in a preferred embodiment thereof which will be readily understood from the following description when taken in connection with the accompanying drawing in which.

Figure 1:
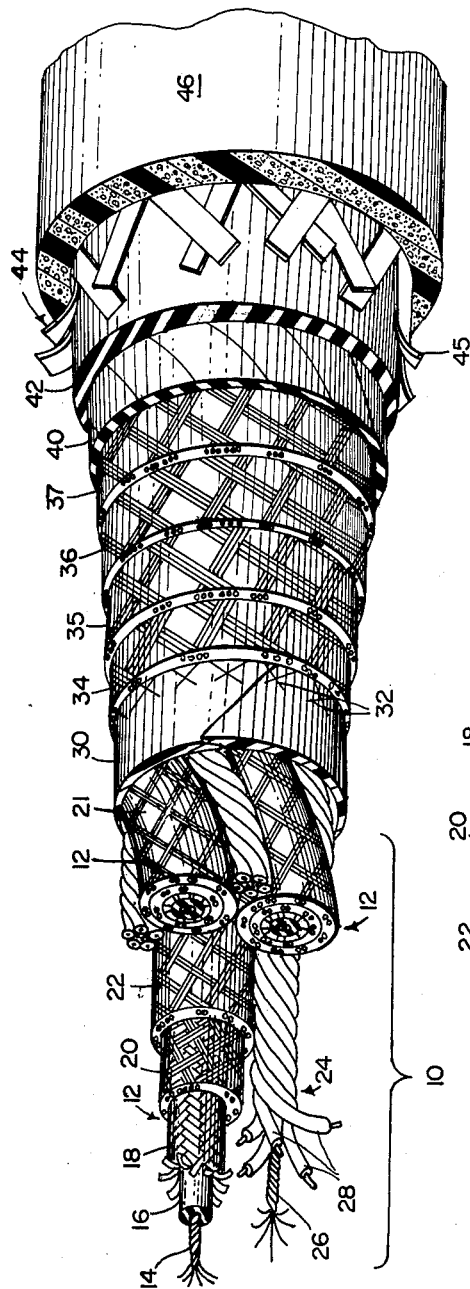
FIG. 1 is a cutaway perspective view of a buoyant cable constructed in accordance with the present invention.
Figure 2:
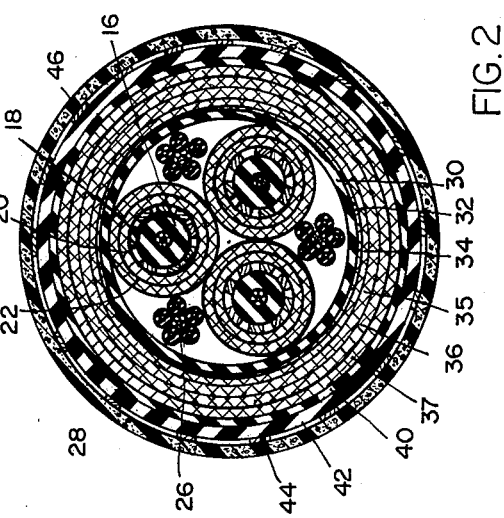
FIG. 2 is a cross sectional view of the cable of FIG. 1.
Figure 4:
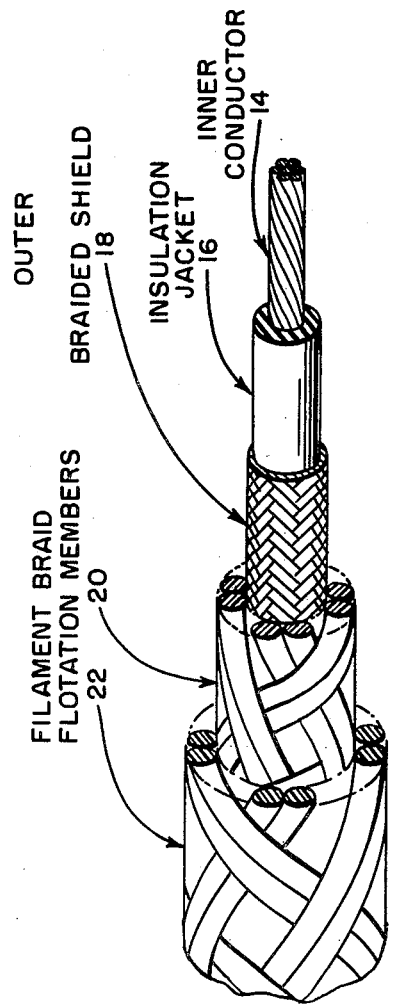
FIG. 4 is an enlarged view of one of the conductors of FIG. 1 showing the associated filament braid flotation members.

With reference to the drawing and particularly FIGS. 1 and 2, a buoyant cable constructed in accordance with the present invention comprises a cabled core, generally indicated at 10. The cabled core 10 comprises a plurality of conductor elements generally indicated at 12 and 24. Each conductor element 12, which for example might be for the purpose of carrying power to the towed vehicle, comprises a conductor 14, which for example might be a cabled copper wire. The conductor 14 is surrounded by an insulating jacket 16 which has a specific gravity of less than one. In the specific embodiment shown, the jacket 16 is extruded foam polyethylene which has a specific gravity of approximately 0.5. Surrounding the jacket 16 is a braided shield 18 which in the specific embodiment shown is fabricated from silver plated copper wire. As will be apparent, the shield 18 and conductor 14 provide a coaxial conductor structure.

In accordance with the invention, a pair of flotation members or sleeves 20 and 22 are braided over the shield 18 with the member 20 being disposed inside the member 22. More specifically, each of the flotation members 20 and 22 are polyethylene filaments which are braided to form a foraminate sleeve, with the element 20 being braided over the shield 18 and the element 22 being braided over the element 20. The members 20 and 22 are provided with an open weave construction. For example, in the specific embodiment shown, the members 20 and 22 each comprise picks 21, each of which consists of two polyethylene filaments having a diameter of approximately .015 inch and with the braid having approximately 6½ picks per inch. There will thus be substantial spacing of the picks laid in the same direction. As shown in FIG. 1 at 20 and 22, the elements 20 and 22 are initially woven with the filaments of successive layers disposed at different angles to the axis of the conductor. In this fashion a "bridging" or non-registering effect is produced between the open weave members. As will thus be apparent this construction provides multiplicity of void spaces between the inner diameter of the member 20 and the outer diameter of the member 22 over the length of the cable. The polyethylene filaments have a specific gravity of approximately .97. However, the specific gravity of the cross section of the two superposed flotation elements 20 and 22 is, by the construction of this invention, reduced to approximately 0.3.

The conductor elements 24 of the core 10 each include a center member 26 comprising cabled or twisted polyethylene filament. Cabled about each core 26 are a plurality of conductors 28 each comprising a conductor wire and an extruded polyethylene jacket surrounding the wire.

It should be apparent from the above that the only portions of the core 10 which have a specific gravity greater than one are the conductors 14 and shield 18 of the conductor elements 12 and the wire portions of the conductors 28. The high specific gravity of these elements is substantially offset by the specific gravity of the novel flotation members 20 and 22. Also, the polyethylene insulation 16 of each conductor element 12 contributes to a reduction in the specific gravity of the over all core 10. The filamented polyethylene core 26 and sheath of the conductors 28 have a specific gravity only slightly less than unity so that while these elements do not particularly contribute to offsetting the high specific gravity of the metallic elements of the core, they do not detract from the desired buoyancy of the cable.

Disposed over the cable core 10 is a wrapping of aluminum backed plastic tape. The plastic base of the tape is fabricated from Mylar or polyethylene terphthalate. The tape is applied with the dull Mylar side toward the core and with the shiny aluminum side facing outwardly. The tape is overlapped slightly and is applied with a relatively light tension so as not to crush the braided filaments of the flotation members 20 and 22. In accordance with one aspect of the invention an open weave metal braid 32 is provided over the tape 30. More specifically, the braid 32 is formed from .008", 32 AWG copper wire braided to a configuration of approximately four picks per inch. The braid 32 is braided over the tape 30, with relatively light tension so as not to crush the flotation members 20 and 22. The tape 30 and braid 32 provide an effective, light weight electrostatic shield. The tape is relatively fragile, and under adverse service conditions it is possible that the tape might tear. The braid 32, while described as a copper braid might be copper, aluminum or other suitable material, and provides continuity between the ends of the tape 30 so that even though a portion of the tape separates, the separated portions will be electrically connected. The braid 32 further provides a means for electrical connection at the end of the cable not requiring mechanical connection directly to the tape 30.

Further in accordance with the invention a plurality of flotation members or sleeves 34–37 are superposed one over the other and over the braid 32. The flotation members 34–37 are similar in construction to the flotation members 20 and 22 previously described. However, in the specific embodiment shown each of the picks of the flotation members 34–37 comprise three extruded polyethylene filaments of approximately .015 inch diameter with the members 34 and 36 having approximately four to five picks per inch while the members 35 and 37 have approximately six to eight picks per inch. In the case of each of the members 34–37, the tension on the filaments is maintained relatively light during the braiding of the members so as not to crush the filaments in the underlying members. The void spaces provided between the inner diameter of the flotation element 34 and the outer diameter of the flotation element 37 provide a specific gravity for the overall cross sectional area of the elements 34–37 of approximately 0.3 thus contributing materially to the buoyancy of the overall cable while not increasing the diameter to any substantial amount.

Surrounding the flotation member 37 is a layer of Mylar tape, which when wound is preferably overlapped slightly, and further which is wound under light tension in order not to crush the flotation members disposed thereunder. Surrounding the tape 40 is a water proof buoyant rubber jacket 42. The jacket 42 provides the water barrier for the portions of the cable disposed therewithin. The material from which the jacket 42 is fabricated should preferably have a specific gravity of no greater than one in order not to detract from the buoyancy of the cable. It should be particularly understood that the jacket 42 is the member which seals the inner portion of the cable from the environment outside of the cable and provides the watertight integrity of the void spaces provided by the flotation members 20, 22 and 34–37. It might here be noted that one of the distinct advantages of a cable constructed in accordance with the present invention is that if water should enter the cable, the water may be easily removed simply by providing air pressure at one end of the cable. The void spaces provided by the flotation members 20, 22 and 34–37 will permit the passage of air longitudinally through the cable to clear the water from the void spaces therein whereupon the cable may again be utilized. The layer of Mylar tape 40 disposed between the waterproof jacket 42 and flotation member 37 prevents the resilient material of the jacket 42 from penetrating the flotation member 37 so as to detract from the buoyancy thereof and further insures that if there is any incompatibility between the filaments of the member 37 and the material of the jacket 42, the filament 37 will not be adversely affected. In this connection, while the tape 40 of the embodiment shown is of Mylar, it may be of other material such as paper, cotton, etc. suitable to provide the desired barrier between the jacket 42 and flotation member 37.

Disposed over the jacket 42 is an armor braid 44 formed from braided flat stainless steel strip 45. The armor braid 44 serves to protect the inner portions of the cable and also assures that the cable will not twist about its longitudinal axis as it is being towed through the water. The armor also provides the cable with a high breaking strength while at the same time is capable of continual flexing during winding and unwinding the cable. The armor sheath 44, in the specific embodiment shown, is fabricated from stainless steel strips .009 inch by .080 inch in cross section with the braid being constructed with approximately two and one half picks per inch. Another advantage of the cable is that it will be non-magnetic when constructed with the shield provided by the tape 30 and braid 32 and with the armor 44 fabricated of stainless steel.

Surrounding the armor jacket 44 is an outer jacket 46 fabricated of foamed polyethylene. The outer jacket 46 does not provide any watertight integrity with respect to the inner portions of the cable; rather it provides an outer protective covering and in addition provides a fine adjustment of the buoyancy of the cable. More specifically, the wall thickness of the outer jacket 46 may be adjusted during the manufacture of the cable so that the overall specific gravity of the cable is no greater than one. Thus by the construction of certain inner elements of the cable, and most particularly the flotation members 20, 22, 34–37, the specific gravity of the overall cable assembly less the outer jacket 46 is roughtly adjusted to approach unity, and the final adjustment of the specific gravity of the cable may be provided by the selection of the wall thickness of the outer jacket 46. In the specific embodiment shown, the cable has a diameter of one inch, while the wall thickness of the sheath or covering 46 is only approximately .050 inch. The outer sheath 46 contributes approximately one-fourth of the total buoyancy provided by the flotation members 20, 22 and 34–37, and the sheath 46. Thus, it will be apparent that the buoyancy of the cable is for the most part due to the flotation sleeves 20, 22 and 34–37. Also, the flotation members occupy only approximately 35% of the cable cross sectional area thus permitting the desired reduction in cable outer diameter.

Figure 3:
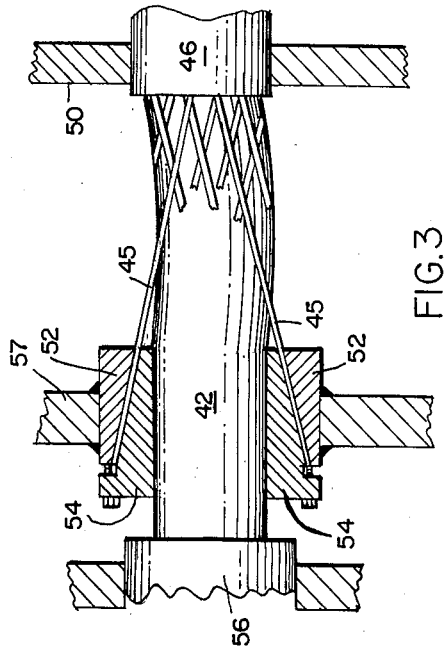
FIG. 3 is a fragmentary side view illustrating a manner of connecting the cable to a towing vehicle.

The construction of the cable of this invention offers an additional advantage in the facility of mechanical attachment of the cable to a towing or towed vehicle. For example, as shown in FIG. 3, after entering the towing vessel through a wall 50 the outer jacket is cut back to expose a portion of the armor, and the setups or strips 45 of the armor are mechanically connected to a vessel mounted towing bracket 57 by means of clamps 52 and 54. The end of the cable is connected to a suitable waterproof electrical connector 56 which is fixed with respect to the bracket 57. It will be observed that the portion of cable inwardly of the armor 45 is provided with a slight curvature or bow, so that the armor 45 will also provide a strain relief during towing of the cable. In other words, the longitudinal stress on the cable due to the towing operation will be taken up by the armor and not by the conductors or other elements within the cable. This, of course, is advantageous in that it tends to eliminate fracture of any of the conductors in the cable during a towing operation.

Inasmuch as many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

It is also to be understood that the language in the following claims is intended to cover all of the generic and specific features of the invention herein described and all statements of the scope of the invention which, as a matter of language, might be said to fall therebetween.

I claim:

1. In a buoyant cable including a plurality of electrical conductors, a plurality of superposed braided sleeve-like flotation members positioned surrounding said conductors, each said flotation member being braided from filamentary material, and a waterproof sheath surrounding said flotation members, each of said flotation members being provided with a substantial spacing between filamentary material laid in the same direction thereby to provide a multiplicity of void spaces within said sheath.

2. In a buoyant cable as described in claim 1, said filamentary material being polyethylene.

3. In a buoyant cable including a plurality of electrical conductors, a plurality of superposed braided sleeve-like flotation members surrounding the conductors and each being braided from filamentary material having a specific gravity of less than one, and a waterproof sheath surrounding said flotation members, each of said flotation members being provided with a substantial spacing between filamentary material laid in the same direction and adjacent members having the filaments thereof disposed at different angles to the principal axis of the said cable thereby to provide a multiplicity of void spaces within said sheath.

4. In a buoyant cable including a core including at least one electrical conductor, a plurality of superposed braided sleeve-like flotation members surrounding the conductor, a plurality of superposed braided sleeve-like flotation members surrounding the core, and a waterproof sheath surrounding the last mentioned flotation members, each of said flotation members being braided from filamentary material and being provided with a substantial spacing between filamentary material laid in the same direction and adjacent members having the filaments thereof disposed at different angles to the principal axis of the said cable thereby to provide a multiplicity of void spaces within said sheath.

5. In a cable as described in claim 4, said core including a plurality of electrical conductors with a plurality of superposed braided sleeve-like flotation members surrounding the conductors, and an electric shield surrounding the core, said shield comprising a layer of metal foil over which is braided an electrically conductive open braid, said shield being contained within said sheath.

6. In a buoyant cable as described in claim 4, a wrapping of plastic film over said sheath, an open braided metal armor braided over said film, and an outer sheath of buoyant material extended over said armor, the buoyant effect afforded by said flotation members being substantially greater than that of said outer sheath.

7. A buoyant cable comprising a core; said core comprising a plurality of sets of electrical conductors having an insulating sheath of material having a specific gravity no greater than one, a plurality of coaxial electrical conductors cabled with the said sets of conductors, each coaxial conductor including a conductor core surrounded by a sheath of insulating material having a specific gravity no greater than one, and a braided metal layer over the sheath, and a plurality of superposed sleeve-like flotation members braided over the braided metal layer of each coaxial conductor; a plurality of superposed braided sleeve-like flotation members surrounding the core; and a waterproof sheath surrounding the last mentioned flotation members; each of said flotation members including a plurality of picks spaced apart a substantial distance providing a multiplicity of void spaces within the cable.

8. A buoyant cable as described in claim 7 in which an electrostatic shield is disposed between said core and said last-mentioned flotation members and which comprises a metal foil backed plastic film wrapped over said core with the metal facing outwardly, and an open metal braid braided over said foil.

9. A buoyant cable as described in claim 8 in which a wrapping of tape is disposed between said last-mentioned flotation members and said sheath, said sheath being fabricated of a resilient rubber-like material, an open braided metal armor over said sheath, and an outer sheath of low density material positioned over said armor, the buoyant effect afforded by said flotation members being substantially greater than that of said outer sheath.

References Cited in the file of this patent

UNITED STATES PATENTS

| | | |
|---|---|---|
| 1,923,859 | Boggs | Aug. 22, 1933 |
| 2,198,093 | Smythe | Apr. 23, 1940 |
| 2,269,877 | Johnson | Jan. 13, 1942 |
| 2,577,077 | Forsberg | Dec. 4, 1951 |
| 2,621,703 | Morrison | Dec. 16, 1952 |
| 2,834,828 | Ebel | May 13, 1958 |
| 2,892,007 | Richards et al. | June 23, 1959 |
| 2,924,141 | Kinnburgh | Feb. 9, 1960 |
| 2,967,902 | Pasini | Jan. 10, 1961 |
| 2,979,982 | Weitzel | Apr. 18, 1961 |

FOREIGN PATENTS

| | | |
|---|---|---|
| 822,253 | Great Britain | Oct. 21, 1959 |